United States Patent
Rumpel et al.

[11] Patent Number: 5,954,352
[45] Date of Patent: Sep. 21, 1999

[54] REAR SUSPENSION FOR A MOTOR VEHICLE

[75] Inventors: Manfred Carl Rumpel, Bloomfield Hills; Joseph Walter Neal, Detroit, both of Mich.

[73] Assignee: Ford Global Technologies, Inc., Dearborn, Mich.

[21] Appl. No.: 09/135,464

[22] Filed: Aug. 17, 1998

[51] Int. Cl.$^6$ ..................................... B60G 7/02
[52] U.S. Cl. ................ 280/124.134; 280/124.125; 280/124.135; 280/124.157
[58] Field of Search .............. 280/124.134, 124.1, 280/124.109, 124.11, 124.116, 124.125, 124.128, 124.135, 124.155, 124.157, 124.177, 124.179, 124.175

[56] References Cited

U.S. PATENT DOCUMENTS

| | | |
|---|---|---|
| 4,484,767 | 11/1984 | Klem . |
| 4,854,603 | 8/1989 | Scaduto . |
| 5,098,116 | 3/1992 | Edahiro et al. . |
| 5,114,176 | 5/1992 | Sawai . |
| 5,340,146 | 8/1994 | Kato . |

FOREIGN PATENT DOCUMENTS

| | | |
|---|---|---|
| M-22155 | 3/1956 | Germany . |
| 403-227707 | 8/1991 | Japan . |
| 404-278814 | 10/1992 | Japan . |

*Primary Examiner*—Eric Culbreth
*Attorney, Agent, or Firm*—Gregory P. Brown

[57] ABSTRACT

A rear suspension has a hub carrier (12) to which a wheel of a vehicle may be rotatably mounted, and a suspension arm (16) pivotally interconnecting the hub carrier to a chassis. The suspension arm includes a crank portion (50) located between the interconnections to the hub carrier and the chassis. The crank portion extends radially outward from the suspension arm and includes a crank end (52) disposed a first predetermined distance outward from the suspension arm. The suspension also includes a shock absorber (56) having a first end (55) pivotally attached to the crank end (52) of the suspension arm (16) and a second end (58) pivotally attached to the chassis.

10 Claims, 1 Drawing Sheet

REAR SUSPENSION FOR A MOTOR VEHICLE

BACKGROUND OF THE INVENTION

1. Field of the Invention

The present invention relates to vehicle suspensions and in particular to rear suspensions with lateral control arms and space efficient shock packaging.

2. Disclosure Information

In conventional motor vehicle suspensions, rear shock absorbers and struts are mounted vertically for a variety of reasons. The shock absorbers and strut assemblies are usually attached to structure located behind the rear seats. The interior volume of the trunk is only minimally impacted by this design feature, as the trunk region immediately behind the seats is difficult to access. On the other hand, vehicles such as sport utility vehicles, station wagons and vans all seek to provide low, flat load floors. Additionally, consumers of these vehicles place a premium on total cargo volume as well as on the width of the load floor. For this reason, vehicle manufacturers have provided rear suspensions having the shock absorbers tilted from the vertical so as to reduce their overall vertical intrusion in the vehicle while maintaining desirable shock travel. However, the tilted shock absorbers still place limits on how low the load floor can be positioned within the vehicle.

It would be desirable to provide a suspension capable of using a shock absorber in a vertical configuration as well as one that would allow the shock absorber to be oriented horizontally within the vehicle so as to allow a low load floor.

SUMMARY OF THE INVENTION

The present invention provides a rear suspension for a motor vehicle that is capable of having either a shock absorber or strut oriented either vertically or horizontally within the vehicle. In accordance with one aspect of the present invention, the rear suspension comprises a hub carrier to which a wheel of a vehicle may be rotatably mounted, and a suspension arm pivotally interconnecting the hub carrier to a chassis. The suspension arm includes a crank portion located between the interconnections to the hub carrier and the chassis. The crank portion extends radially outward from the suspension arm and includes a crank end disposed a first predetermined distance outward from the suspension arm. The suspension also includes a shock absorber having a first end pivotally attached to the crank end of the suspension arm and a second end pivotally attached to the chassis.

It is an advantage of the present invention to provide a simple, low cost rear suspension particularly suited for use on motor vehicles having wide, low load floors, such as wagons and vans.

DETAILED DESCRIPTION OF PREFERRED EMBODIMENTS

Figure 1:
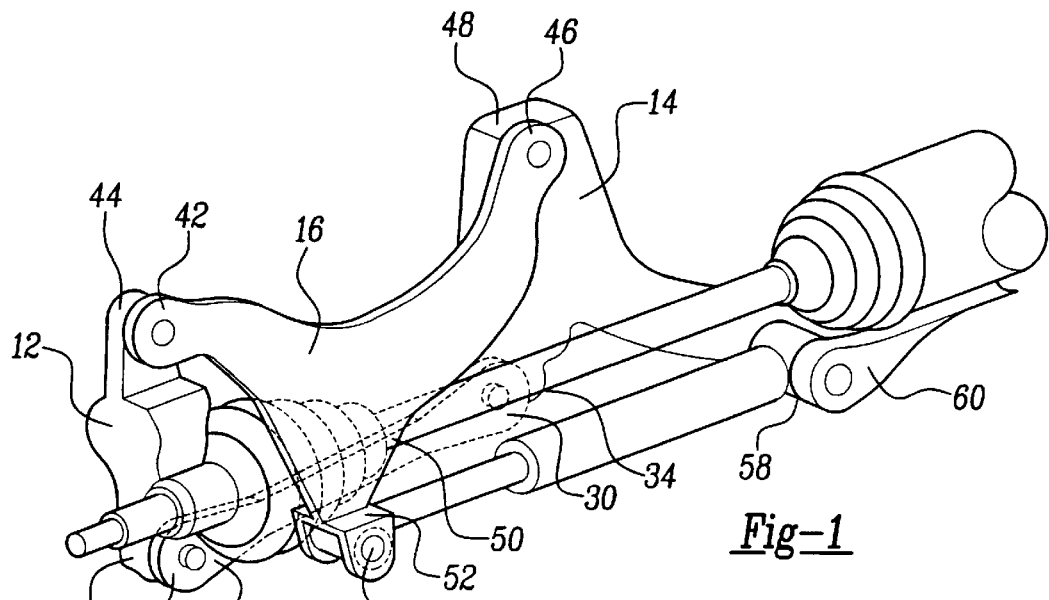
FIG. 1 is a partial perspective view of a vehicle suspension in accordance with the present invention.
Figure 2:
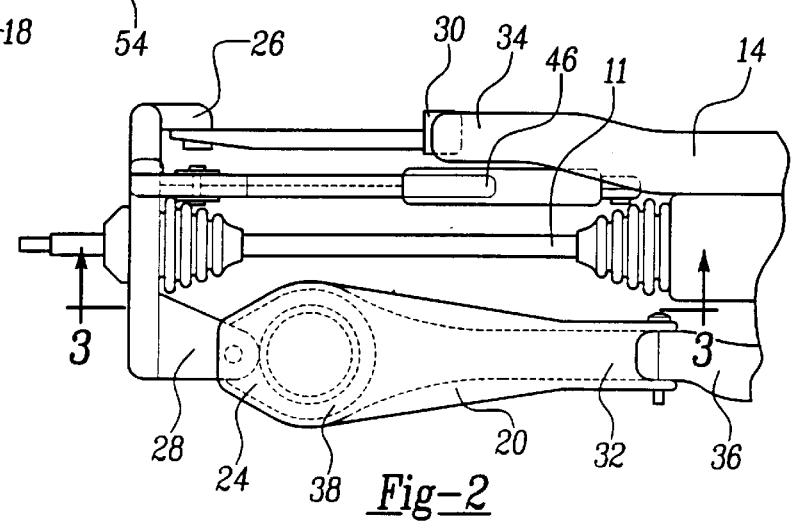
FIG. 2 is a plan view of a vehicle suspension in accordance with the present invention.
Figure 3:
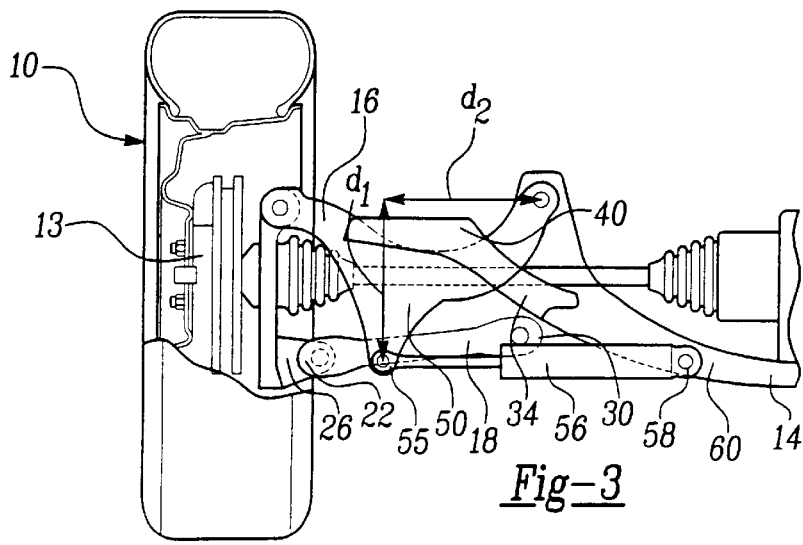
FIG. 3 is a partial rear view of a vehicle suspension in accordance with the present invention.

As illustrated in FIGS. 1, 2 and 3, a rear suspension for a motor vehicle includes a tire and wheel assembly 10 mounted on an axle 11 driven hub 13 rotatably supported in a hub carrier 12. The hub carrier 12 is mounted with respect to a frame member, unibody structure or a sub-frame of the vehicle chassis 14, by upper and lower suspension arms 16, 18 and 20.

The two lower suspension arms 18 and 20 are each pivotally attached at their lower outer ends 22 and 24 to lower attachment points 26 and 28 on the hub carrier 12, by bushings, ball joints or roller bearings as are commonly used by those skilled in the art for such pivoting attachments. Similarly, the two lower suspension arms 18 and 20 are each pivotally attached at their inner ends 30 and 32 to lower attachment points 34 and 36 on the sub-frame 14. A lower spring seat 38 is located on the rearward lower suspension arm 20 for retaining a coil spring in an opposing spring seat (not shown) located on the subframe 14.

The upper suspension arm 16 is pivotally attached at its upper outer end 42 to an upper attachment point 44 on the hub carrier 12 and at its upper inner end 46 to an upper attachment point 48 on the subframe 14. The upper suspension arm may be kinematically characterised by a longitudinal axis extending between the upper outer and inner ends 42 and 44. The upper suspension arm also includes a crank portion 50 extending radially outward from the longitudinal axis. Preferably, the crank portion 50 extends downward from the upper suspension arm 16 when installed in the vehicle.

The crank portion 50 includes a crank end 52 having a clevis 54 thereon for connection to a first end 55 of shock absorber 56 in a conventional manner. The crank end is positioned a predetermined distance, $d_1$, from the longitudinal axis of the upper suspension arm and a predetermined distance, $d_2$, from the upper inner end 46. In the preferred embodiment, the ratio of $d_1$ to $d_2$ falls within the range of 0.9 to 1.1, which results in kinematics that provide a wheel-to-shock travel ratio of approximately 2:1.

Additionally, it is desirable to extend the crank end 52 to allow the shock absorber to be substantially horizontal when the suspension is at predetermined ride height. For example, for a commuter type vehicle, this might be a ride height corresponding to vehicle loaded with the weight of two passengers. In the preferred embodiment, this vertically spaces the shock absorber at the same vertical location as the lower suspension arms 18 and 20. Beneficially, this provides protection for the shock absorber from stone strikes or other operating environment hazards.

The shock absorber 56 also includes a second end 58 which is inboard of the first end 55 and pivotally attached to a shock attachment point 60 on the subframe 14. The second end 58 extends inboard considerably further than the lower inner end of the forward lower suspension arm to provide maximum shock travel. While it is not illustrated, it is possible to locate the second end 58 of the shock absorber even further inboard than the lower inner end of the rearward lower suspension arm.

With the suspension assembly described above, the suspension loads are transmitted to the chassis from the hub carrier 12 through the suspension arms 16, 18 and 20 and the shock absorber via crank arm 50. One positive consequence of this configuration is the elimination of vertical shock forces being imparted on the vehicle structure. Under certain loading, such as when hitting obstructions simultaneously with both wheels, such as joints in the road surface, the horizontally opposed shock absorbers apply forces that are generally equal and oppositely directed. This can provide tuning advantages for improved noise, vibration and harshness performance, in addition to the improved package.

It further should be noted that when desired, a vertical shock absorber can readily be accomodated by this suspension by simply making provisions on the upper suspension arm for attachment of the lower end of the shock absorber adjacent to the upper outer end. This allows the suspension to be used in both sedans having vertical shock absorbers as well as wagons, vans, etc. with horizontal shock absorbers by changing only the upper suspension arm and the shock absorber.

The foregoing detailed description presents a preferred embodiment of the present invention. Details of construction have been shown and described for purposes of illustration rather than limitation. For instance, the above embodiments relate to rear wheel suspensions having a driven axle extending therethrough, however, the present invention is equally applicable to a rear suspension that is undriven. Further modifications and alterations of the invention will no doubt occur to those skilled in the art that will come within the scope and spirit of the following claims.

We claim:

1. A rear suspension for a motor vehicle comprising:

a hub carrier to which a wheel of the vehicle may be rotatably mounted;

a suspension arm pivotally interconnecting said hub carrier to a chassis, said suspension arm having a longitudinal axis;

a crank portion of said suspension arm between said interconnections to said hub carrier and said chassis, said crank portion extending outward from said suspension arm and having a crank end disposed a first predetermined distance from said longitudinal axis of said suspension arm; and a shock absorber having a first end pivotally attached to said crank end of said crank portion of said suspension arm and a second end pivotally attached to said chassis further inboard than said interconnection of said suspension arm to said chassis.

2. The rear suspension as claimed in claim 1, wherein said suspension arm is an upper suspension arm.

3. The rear suspension as claimed in claim 1, wherein said first predetermined distance forms a predetermined ratio with a second predetermined distance measured between an a perpendicular projection of said crank end onto said longitudinal axis of said suspension arm and said interconnection of said suspension arm to said chassis.

4. A rear suspension for a motor vehicle comprising:

a hub carrier to which a wheel of the vehicle may be rotatably mounted, a lower suspension arm pivotally interconnecting said hub carrier to a chassis;

an upper suspension arm pivotally interconnecting said hub carrier to said chassis, said upper suspension arm having a longitudinal axis;

a crank portion of said upper suspension arm between said interconnections to said hub carrier and said chassis, said crank portion extending downward from said upper suspension arm and having a crank end disposed a first predetermined distance from said longitudinal axis of said suspension arm; and a shock absorber having a first end pivotally attached to said crank portion of said upper arm and a second end pivotally attached to said chassis.

5. The rear suspension as claimed in claim 4, wherein said shock absorber is substantially horizontal under a predetermined vehicle loading condition.

6. The rear suspension as claimed in claim 4, wherein said first predetermined distance forms a predetermined ratio with a second predetermined distance measured between a perpendicular projection of said crank end onto said longitudinal axis of said suspension arm and said interconnection of said suspension arm to said chassis.

7. The rear suspension as claimed in claim 4, wherein said second end of said shock absorber is disposed further inboard than either of said lower suspension arm and said upper suspension arm interconnections to said chassis.

8. A rear suspension for a motor vehicle comprising:

a hub carrier to which a wheel of the vehicle may be rotatably mounted, a lower suspension arm having a lower outer end pivotally attached to said hub carrier and a lower inner end pivotally attached to a chassis;

an upper suspension arm having an upper outer end pivotally attached to said hub carrier and an upper inner end pivotally attached to said chassis, said upper suspension arm having a longitudinal axis extending through said upper inner and outer ends;

a crank portion of said upper suspension arm between said upper outer end and said upper inner end, said crank portion extending downward from said upper suspension arm and having a crank end disposed a first predetermined distance from said longitudinal axis of said suspension arm; and a shock absorber having a first end pivotally attached to said crank end of said crank portion of said upper arm and a second end pivotally attached to said chassis such that under a predetermined vehicle loading condition said shock absorber is vertically spaced from said longitudinal axis of said upper suspension arm substantially similar to a vertical spacing of said lower suspension arm from said upper suspension arm.

9. The rear suspension as claimed in claim 8, wherein said second end of said shock absorber is disposed further inboard than either of said lower suspension arm and said upper suspension arm interconnections to said chassis.

10. The rear suspension as claimed in claim 8, wherein said first predetermined distance forms a predetermined ratio with a second predetermined distance measured between a perpendicular projection of said crank end onto said longitudinal axis of said suspension arm and said interconnection of said suspension arm to said chassis.

* * * * *